(12) United States Patent
Sekiguchi

(10) Patent No.: US 11,453,184 B2
(45) Date of Patent: Sep. 27, 2022

(54) PUNCTURE REPAIR KIT CONTAINER

(71) Applicant: The Yokohama Rubber Co., LTD., Tokyo (JP)

(72) Inventor: Takumi Sekiguchi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 386 days.

(21) Appl. No.: 16/616,940

(22) PCT Filed: Apr. 9, 2018

(86) PCT No.: PCT/JP2018/014947
§ 371 (c)(1),
(2) Date: Nov. 25, 2019

(87) PCT Pub. No.: WO2018/216377
PCT Pub. Date: Nov. 29, 2018

(65) Prior Publication Data
US 2020/0247072 A1 Aug. 6, 2020

(30) Foreign Application Priority Data

May 26, 2017 (JP) .............................. JP2017-104862

(51) Int. Cl.
*B29C 73/16* (2006.01)
*B29C 73/02* (2006.01)
(Continued)

(52) U.S. Cl.
CPC ............ *B29C 73/166* (2013.01); *B29C 73/02* (2013.01); *B29D 2030/0698* (2013.01);
(Continued)

(58) Field of Classification Search
CPC .... B29C 73/166; B65D 83/756; B65D 83/24; B65D 83/40; B65D 47/06
See application file for complete search history.

(56) References Cited

U.S. PATENT DOCUMENTS 5,772,807 A 6/1998 Fourgon
6,708,849 B1 * 3/2004 Carter .................... B65D 83/20
222/530
(Continued)

FOREIGN PATENT DOCUMENTS

DE 103 36 959 2/2005
EP 2 497 629 9/2012
(Continued)

OTHER PUBLICATIONS

International Search Report for International Application No. PCT/JP2018/014947 dated Jun. 19, 2018, 4 pages, Japan.

*Primary Examiner* — Timothy P. Kelly
(74) *Attorney, Agent, or Firm* — Thorpe North & Western

(57) ABSTRACT

Provided is a puncture repair kit container that includes a container body including a holding portion that holds puncture repair liquid and an opening portion provided in one end of the holding portion, a cap mounted on the opening portion, a hose connected to a connecting portion provided in the cap, and an engaging portion that is provided in an outer surface of the cap and that engages the hose in an unused state by causing the hose to extend along a periphery of the cap.

6 Claims, 9 Drawing Sheets

(51) Int. Cl.
*B29D 30/06* (2006.01)
*B29L 30/00* (2006.01)
*B60C 25/00* (2006.01)
*B65D 47/06* (2006.01)

(52) U.S. Cl.
CPC ........... *B29L 2030/00* (2013.01); *B60C 25/16* (2013.01); *B65D 47/06* (2013.01)

(56) References Cited

U.S. PATENT DOCUMENTS

| | | | | |
|---|---|---|---|---|
| 9,242,416 | B1* | 1/2016 | Ohm | B29C 73/166 |
| 9,545,763 | B2* | 1/2017 | Chou | B29C 73/166 |
| 10,781,032 | B2* | 9/2020 | Chou | B65D 83/206 |
| 11,098,841 | B2* | 8/2021 | Chou | F16M 11/22 |
| 2009/0107578 | A1* | 4/2009 | Trachtenberg | B05B 9/0805 141/38 |
| 2013/0138146 | A1 | 5/2013 | Kojima et al. | |
| 2014/0090764 | A1 | 4/2014 | Miyazaki | |
| 2014/0196828 | A1 | 7/2014 | Miyazaki | |
| 2015/0240060 | A1 | 8/2015 | Wada | |
| 2017/0015812 | A1 | 1/2017 | Miyazaki et al. | |
| 2018/0037400 | A1* | 2/2018 | Kuntzelman | B65D 83/753 |
| 2021/0354408 | A1* | 11/2021 | Costle | B29C 73/166 |

FOREIGN PATENT DOCUMENTS

| | | |
|---|---|---|
| JP | S57-046453 | 3/1982 |
| JP | S57-204256 | 12/1982 |
| JP | S58-169059 | 11/1983 |
| JP | H10-100612 | 4/1998 |
| JP | 2004-114524 | 4/2004 |
| JP | 2007-144876 | 6/2007 |
| JP | 3133993 | 8/2007 |
| JP | 2009-242577 | 10/2009 |
| JP | 2011-046299 | 3/2011 |
| JP | 2011-098460 | 5/2011 |
| JP | 2013-220622 | 10/2013 |
| JP | 2013-237337 | 11/2013 |
| JP | 2014-031425 | 2/2014 |
| JP | 2015-101666 | 6/2015 |
| JP | 6068987 | 1/2017 |
| WO | WO 2009/058829 | 5/2009 |
| WO | WO 2011/055633 | 5/2011 |
| WO | WO 2013/008798 | 1/2013 |
| WO | WO 2014/020909 | 2/2014 |
| WO | WO 2015/145843 | 10/2015 |

* cited by examiner

PUNCTURE REPAIR KIT CONTAINER

TECHNICAL FIELD

The present technology relates to a puncture repair kit container, and particularly relates to a puncture repair kit container that improves storability on board and is capable of preventing damage at the time of storage.

BACKGROUND ART

In recent years, when a tire mounted on a vehicle is punctured, puncture repair liquid is injected into the tire via a tire valve to temporarily repair the puncture. As a device that enables such a temporary repair, a puncture repair kit is used. Using the puncture repair kit eliminates the need to provide a vehicle with a spare tire, and makes it possible to save resources and reduce the weight of a vehicle. Additionally, there is also an advantage in that a space for a spare tire in a vehicle can be used for other purposes.

A known puncture repair kit includes, for example, a so-called pump-type puncture repair kit that injects puncture repair liquid held in a container into a tire by compressed air supplied from an air compressor and the like (for example, see Japan Unexamined Patent Publication No. 2013-220622). The container used in such a pump-type puncture repair kit typically includes a container body including a holding portion that holds the puncture repair liquid and an opening portion, and a cap mounted on the opening portion of the container body. Further, a hose for connecting the container (cap) to a compressor is mounted in advance in some cases.

In the puncture repair kit container of such a type that the hose is connected in advance, one end of the hose is released. Thus, storability on board is poor, and there is a risk of a load applied to the hose itself or a connecting portion of the hose to the cap to cause damage. Particularly, in recent years, examinations to reduce a length of the hose have been done with the purpose of further reduction in weight and cost of the puncture repair kit. However, when the length of the hose is reduced, it becomes difficult to store the hose by extending the hose along an outer periphery of the container, and the effects become bigger when a load increases. Thus, a countermeasure has been demanded.

SUMMARY

The present technology provides a puncture repair kit container, particularly a puncture repair kit container that improves storability on board and is capable of preventing damage at the time of storage.

A puncture repair kit container according to an embodiment of the present technology includes a container body including a holding portion that holds puncture repair liquid and an opening portion provided in one end of the holding portion, a cap mounted on the opening portion, a hose connected to a connecting portion provided in the cap, and an engaging portion that is provided in an outer surface of the cap and that engages the hose in an unused state by causing the hose to extend along a periphery of the cap.

In an embodiment of the present technology, the engaging portion is provided in the cap as described above. Thus, even when the hose is connected to the container (cap) in advance, the hose can be engaged by causing the hose to extend along the periphery of the cap when being unused. Thus, storability can be improved, and additionally since ends of the hose are not released, the hose can be prevented from being damaged at the time of storage.

In an embodiment of the present technology, the hose can be connected to the connecting portion on a side of an outflow channel for discharging the puncture repair liquid in the holding portion to the outside of the container, and can have a length of from 50 mm to 150 mm. Even in this aspect, since the engaging portion is provided as described above, the hose can be engaged by causing the hose to extend along the periphery of the cap when being unused. Particularly, even when the hose has a small length as described above, the engaging portion is present on the outer surface of the cap, and thus the hose reliably reaches the engaging portion, and the hose can be engaged appropriately. As a result, storability of the container can be improved, and additionally also in this case, since ends of the hose are not released, damage of the hose at the time of storage can be suppressed.

In an embodiment of the present technology, preferably a flange portion having a flat plate-like shape and having an outer diameter larger than outer diameters of other portions of the cap is provided in a top surface of the cap, and the engaging portion is disposed in a surface in the container body side of the flange portion. The flange portion and the engaging portion are provided as described above, and thus the hose is stored in a recessed portion formed with the flange portion, a cap side surface, and the container body at the time of storage, and storability of the container as a whole can be improved. Additionally, in this case, the hose is stored in the recessed portion and protected by the flange portion and the container body, and thus the damage of the hose can effectively be prevented. Further, the outer diameter of the cap increases, and thus the work of mounting the cap on the container body can be facilitated.

In this case, preferably the flange portion has a fan-like shape as viewed from a side of the top surface of the cap, and the connecting portion and the flange portion are away from each other by a separation distance of from 15 mm to 30 mm. Since the flange portion has a fan-like shape as described above, the flange portion protrudes to the vicinities of both ends of the connecting portion, and the portion protruding as described above can more effectively protect the connecting portion. Meanwhile, the appropriate separation distance between the connecting portion and the flange portion is ensured, and thus good workability at the time of connecting the hose to the connecting portion can be maintained sufficiently.

In an embodiment of the present technology, preferably the cap includes a valve core pressing portion, and the valve core pressing portion has a shape capable of entering a tube having an inner diameter of 5 mm by a distance of 0.5 mm or more. The valve core pressing portion is provided as described above, and thus when air is excessively injected into a tire at the time of puncture repair work, air can be released by pressing a distal end of a valve core with the valve core pressing portion.

DETAILED DESCRIPTION

Configurations of embodiments of the present technology will be described in detail below with reference to the accompanying drawings.

Figure 1:
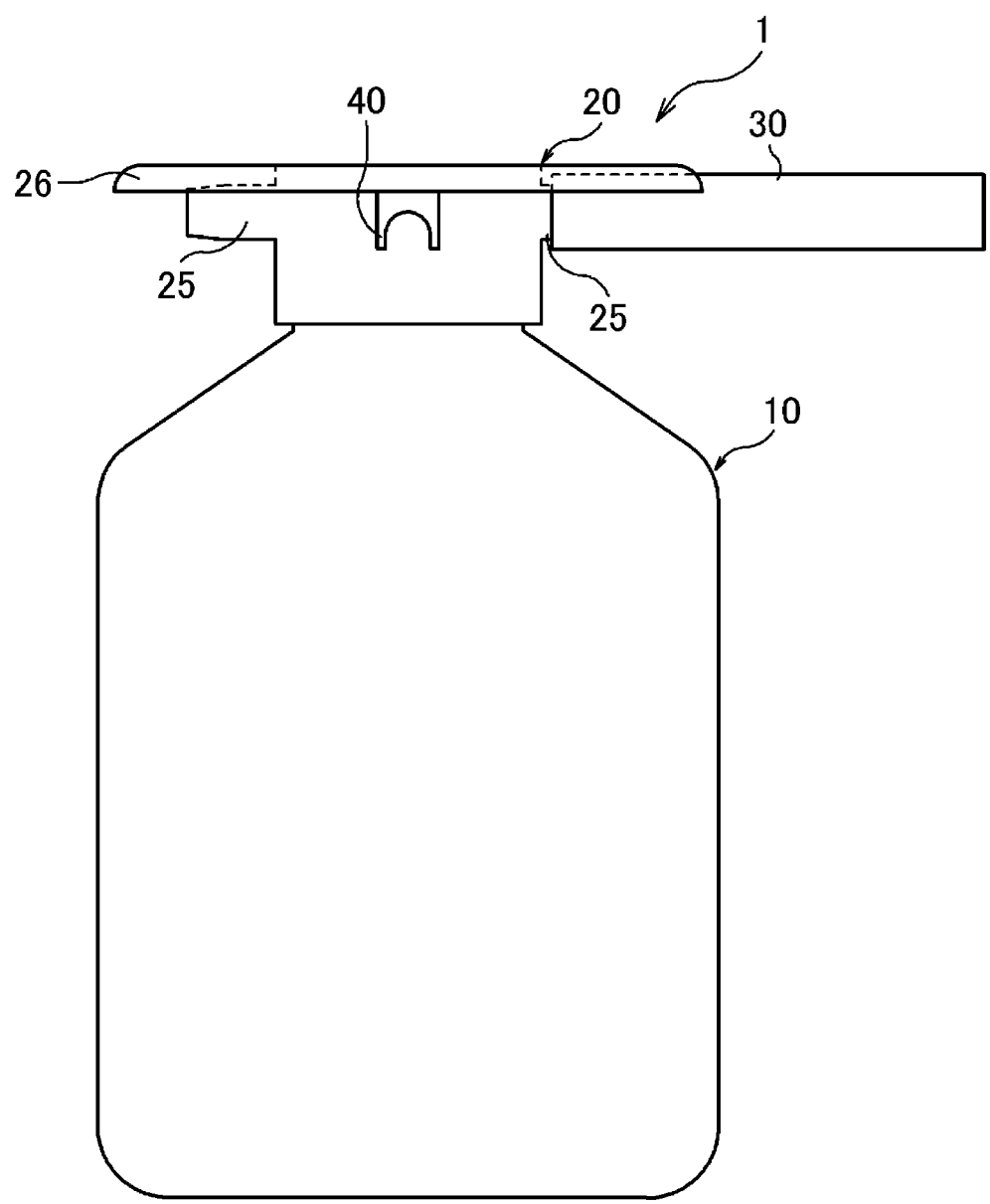
FIG. 1 is a side view illustrating an example of a puncture repair liquid holding container.
Figure 2:
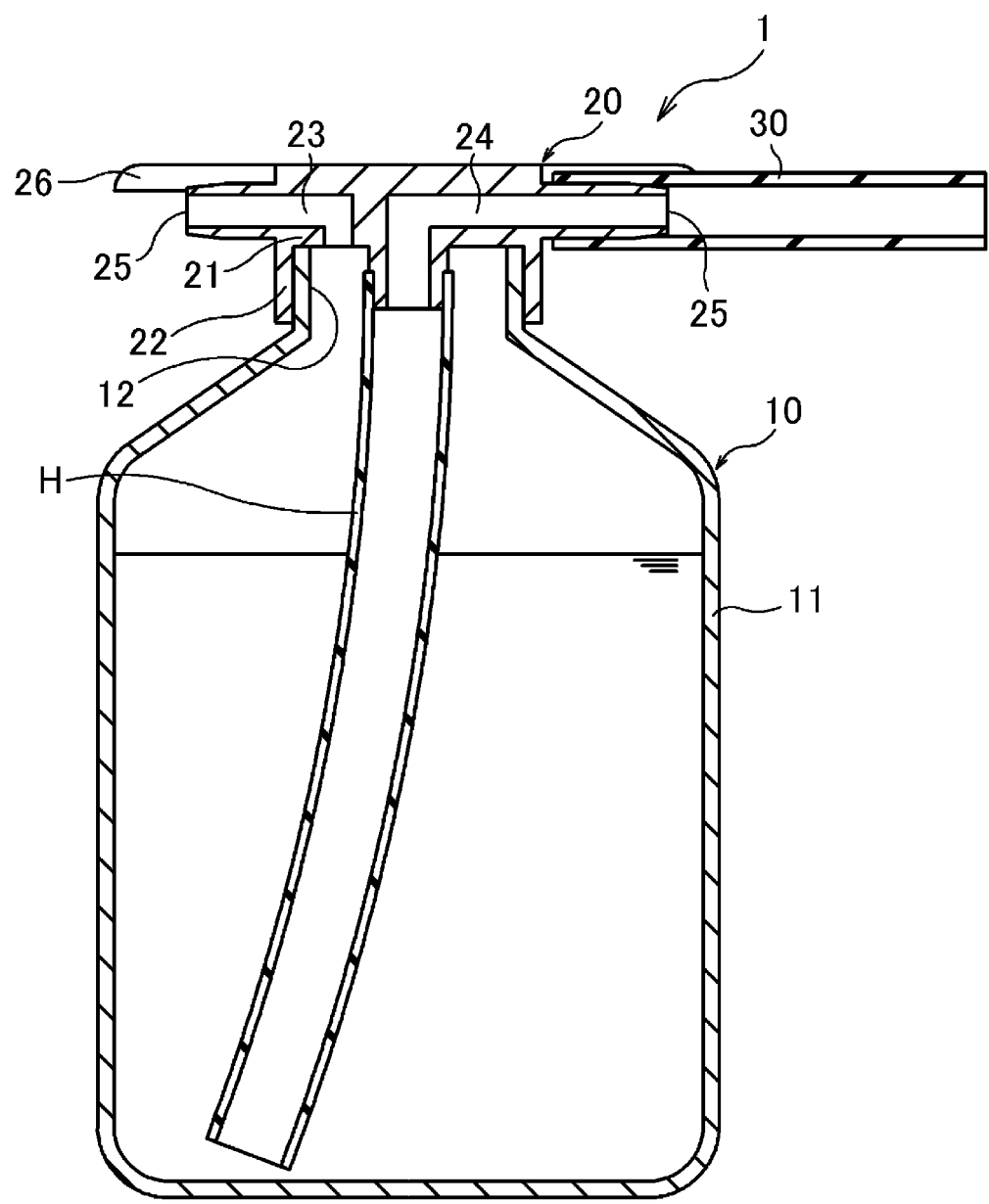
FIG. 2 is a cross-sectional view of the puncture repair liquid holding container of FIG. 1.

As illustrated in FIGS. 1 and 2, a puncture repair kit container 1 (referred to as a "container 1" hereinafter) according to an embodiment of the present technology includes a container body 10, a cap 20, and a hose 30. In an embodiment of the present technology, as described below, the container 1 of such a type that at least one hose 30 is mounted on the cap 20 in advance is provided with an engaging portion 40 in an outer surface of the cap 20, and the engaging portion 40 engages the hose 30 in an unused state by causing the hose to extend a periphery of the cap. Thus, an inner structures of the container body 10 and the cap 20 are not particularly limited, and a structure generally used as a puncture repair kit (container 1) can be employed.

Note that an embodiment of the present technology can be employed suitably in the puncture repair kit (container 1) of such a type that the length of the hose 30 is set to, for example, from 50 mm to 150 mm for weight reduction and that the container body 10 and the cap 20 are used in a pendent state from a tire valve via the hose 30. That is, in the puncture repair kit (container 1) of this type, the hose 30 is short, and thus the hose 30 cannot be held and stored by a method of, for example, causing the hose to extend along and wind about the container body 10 or the periphery of the cap 20, unlike a long hose. The hose can be stored compactly by being engaged by the engaging portion 40 described below.

As illustrated in FIGS. 1 and 2, the container body 10 includes a holding portion 11 that has a cylindrical shape and that holds puncture repair liquid (hereinafter, referred to as "repair liquid") including, for example, rubber latex, and an opening portion 12 that has a cylindrical shape and is located in an upper portion side of the holding portion 11 when the container body 10 is erected and that discharges the repair liquid during use. When the container 1 is erected, a bottom surface of the holding portion 11 is positioned on a side opposite the opening portion 12. Although omitted in the drawings, preferably an outer circumferential surface of the opening portion 12 includes threads that threadedly engage with a screw on the cap 20 side described below. The holding portion 11 and the opening portion 12 are integrally made of, for example, a synthetic resin such as polypropylene and polyethylene. Note that the opening portion 12 may be more tightly sealed with, for example, a film (not illustrated) before the cap 20 described below is attached to prevent deterioration of the repair liquid in the container and leakage of the repair liquid from the opening portion 12.

Figure 3:
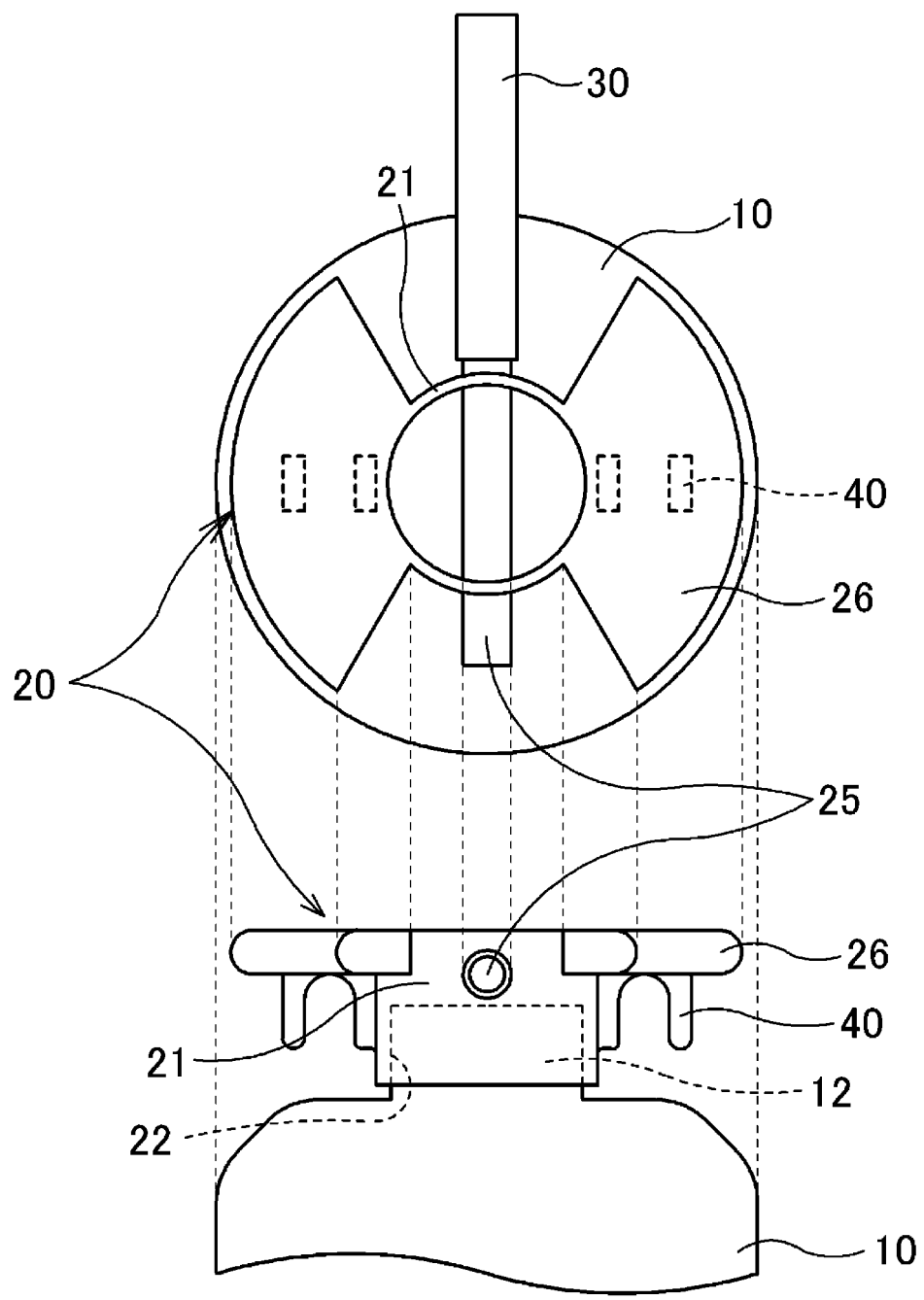
FIG. 3 is an explanatory diagram illustrating a top view and a side view of a cap of FIG. 2 in combination.

As illustrated in FIGS. 1 to 3, the cap 20 includes a lid portion 21 that closes the opening portion 12 and a mounting portion 22 having a cylindrical shape and mountable on the opening portion 12. As described above, when the outer circumferential surface of the opening portion 12 is provided with threads, an inner circumferential surface of the mounting portion 22 can be provided with threads that threadedly engage with a screw in the opening portion 12 side to threadedly engage with the container body 10 (opening portion 12) and the cap 20 (mounting portion 22). The lid portion 21 and the mounting portion 22 are integrally made of, for example, a synthetic resin such as polypropylene and polyethylene. The lid portion 21 is provided with an inflow channel 23 for introducing compressed air from the outside of the container and an outflow channel 24 for discharging the puncture repair liquid in the container, as holes penetrating the lid portion 21. In an end in the container outer side of each of the inflow channel 23 and the outflow channel 24, a connecting portion 25 for connecting the hose 30 is provided. In the illustrated example, the connecting portion 25 protrudes outward of the cap 20 in a radial direction, and the connecting portion 25 in the outflow channel 24 side is inserted into the hose 30. Additionally, at a position on a top surface of the cap 20 (lid portion 21), a flange portion 26 that protrudes outward in the radial direction with respect to the mounting portion 22 is formed. In the illustrated example, the engaging portion 40 is provided in a lower surface of the flange portion 26 (surface in the container body 10 side).

The hose 30 is mounted on the connecting portion 25 of the cap 20 in advance, and connects the container 1 to a compressor or a tire. In the illustrated example, as described above, the hose 30 is mounted as a component of the container 1 only on the connecting portion 25 in the outflow channel 24 side in advance. A material of the hose 30 is not particularly limited. In view of pressure resistance that can resist a pressure of compressed air supplied from a compressor, appropriate flexibility that enables easy handling at the time of puncture repair work, and suppression of degradation caused by long-term storage on board, preferably synthetic rubber such as EPDM is used. In the case of the illustrated example, when the puncture repair kit is used, a released end of the hose 30 is connected to a tire valve. Note that in the case of the illustrated example, a hose (not illustrated) is additionally connected to the connecting portion 25 in the inflow channel 23 side when the puncture repair kit is used. Then, the hose (not illustrated) connects a compressor (not illustrated) and the container 1 (inflow channel 23).

In the illustrated example, the container 1 includes a hose H inside, and the hose H includes one end connected to the cap 20 and the other end extended to a bottom portion of the container body 10. The hose H enables the outflow channel 24 to substantially extend to a bottom of the holding portion 11 to discharge the puncture repair liquid reliably. A structure of the hose H is not particularly limited in an embodiment of the present technology, and thus detailed description of the hose H will be omitted.

Figure 4:
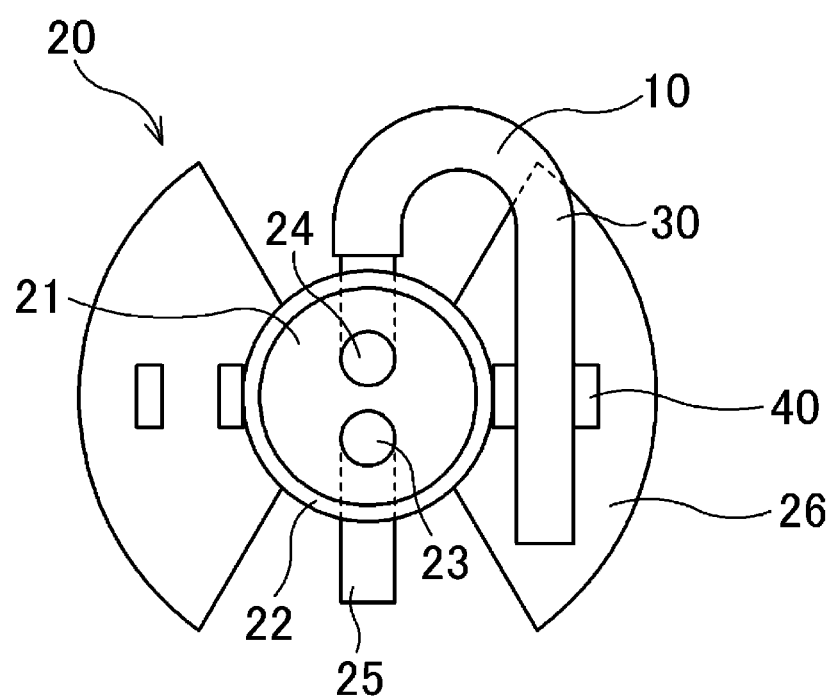
FIG. 4 is an explanatory diagram schematically illustrating a cap with which a hose is engaged as viewed from a container body side in an embodiment of the present technology.

A shape of the engaging portion 40 is not particularly limited as long as the hose 30 can be engaged. For example, in the illustrated example, an engaging portion including a pair of protrusions that are disposed at such an interval that the hose can be sandwiched is used. In this case, as illustrated in FIG. 4, the hose 30 is sandwiched between the protrusions, and thus the hose 30 can be engaged. Additionally, when the puncture repair kit is used, the hose 30 is pulled out from a space between the protrusions, and the hose 30 can easily be taken out. In the case of such an engaging portion 40, preferably the interval between the protrusions is set to from 70% to 80% of the outer diameter of the hose 30. That is, when the interval between the protrusions is set to be slightly smaller than the outer diameter of the hose 30, the hose 30 sandwiched between the protrusions deforms appropriately, and is engaged in such a state. Thus, the hose 30 can be engaged reliably.

In view of durability and the like, preferably the engaging portion 40 is integrally molded with the cap 20. However, the engaging portion 40 as a separate member may be attached to the cap 20. In a case where the engaging portion 40 is attached afterward, there is an advantage in that the engaging portion 40 can be attached optionally to the cap 20 having an existing general structure.

Figure 5:
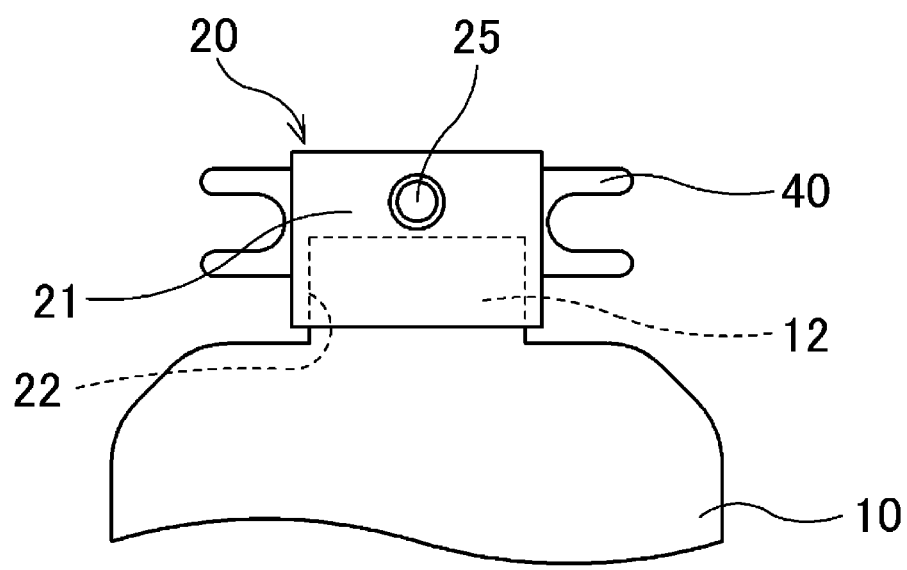
FIG. 5 is a side view illustrating another example of a cap in an embodiment of the present technology.

As in the example illustrated in FIGS. 1 to 4 described above, preferably the engaging portion 40 is disposed on the lower surface of the flange portion 26. The flange portion 26 is a portion having a flat plate-like shape, and protruding radially outward on the top surface of the cap 20 (lid portion 21) and having an outer diameter larger than outer diameters of other portions of the cap 20, as described above. Thus, the side surface of the cap 20 (particularly, the mounting portion 22) is recessed with respect to the flange portion 26 and a side surface of the container body 10, and the hose can be stored in the recessed portion. As a result, storability of the container 1 as a whole can be improved. Note that in a case where the flange portion 26 is provided, the maximum diameter of the cap 20 increases, and thus, a torque generated when the cap 20 threadedly engages with the container body 10 can be increased, and mounting work of the cap 20 can be facilitated. As a matter of course, for example, as illustrated in FIG. 5, the above-described engaging portion 40 formed of the pair of protrusions can also be provided in the side surface of the cap 20 having a columnar shape and an existing structure, without providing the flange portion 26.

Preferably the outer diameter of the flange portion 26 is equivalent to the outer diameter of the holding portion 11 of the container body 10. For example, preferably the outer diameter of the flange portion 26 is from 80% to 110% of the outer diameter of the holding portion 11 of the container body 10. The size of the flange portion 26 is set as described above, and thus storability of the container 1 as a whole can be improved. In view of storability of the container 1 as a whole, more preferably the outer diameter of the flange portion 26 is set to be smaller than the outer diameter of the holding portion 11 of the container body 10.

Figure 6:
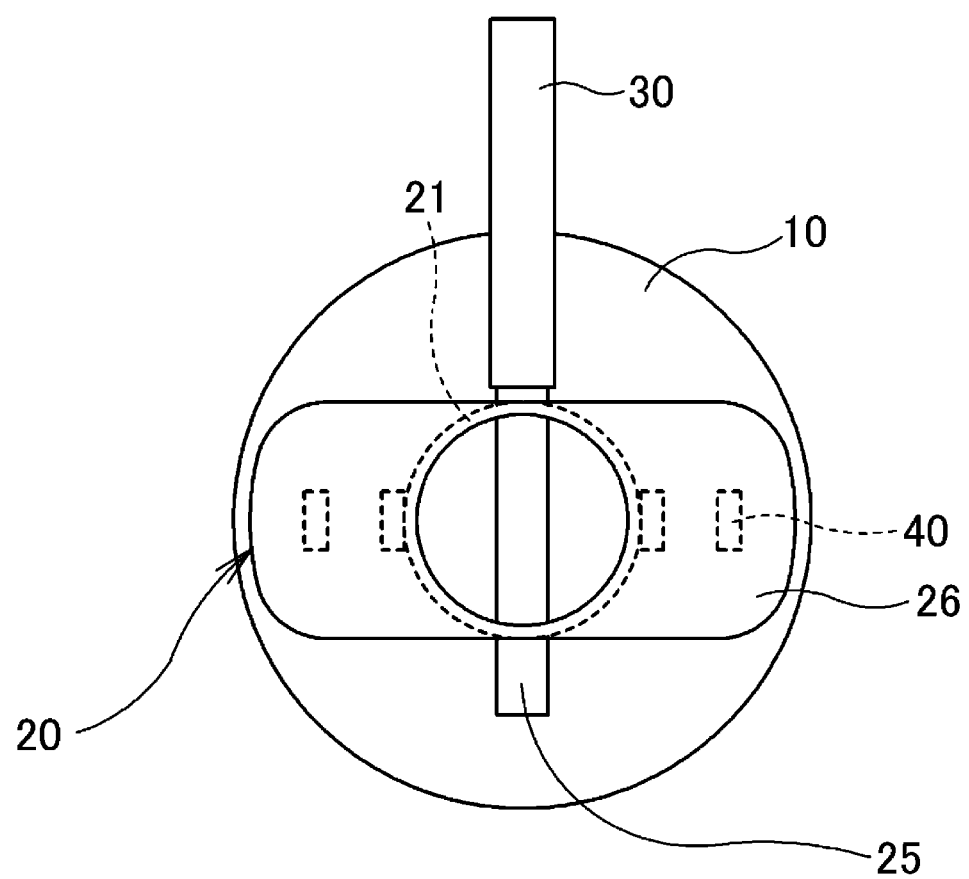
FIG. 6 is a plan view illustrating another example of a cap in an embodiment of the present technology.
Figure 7:
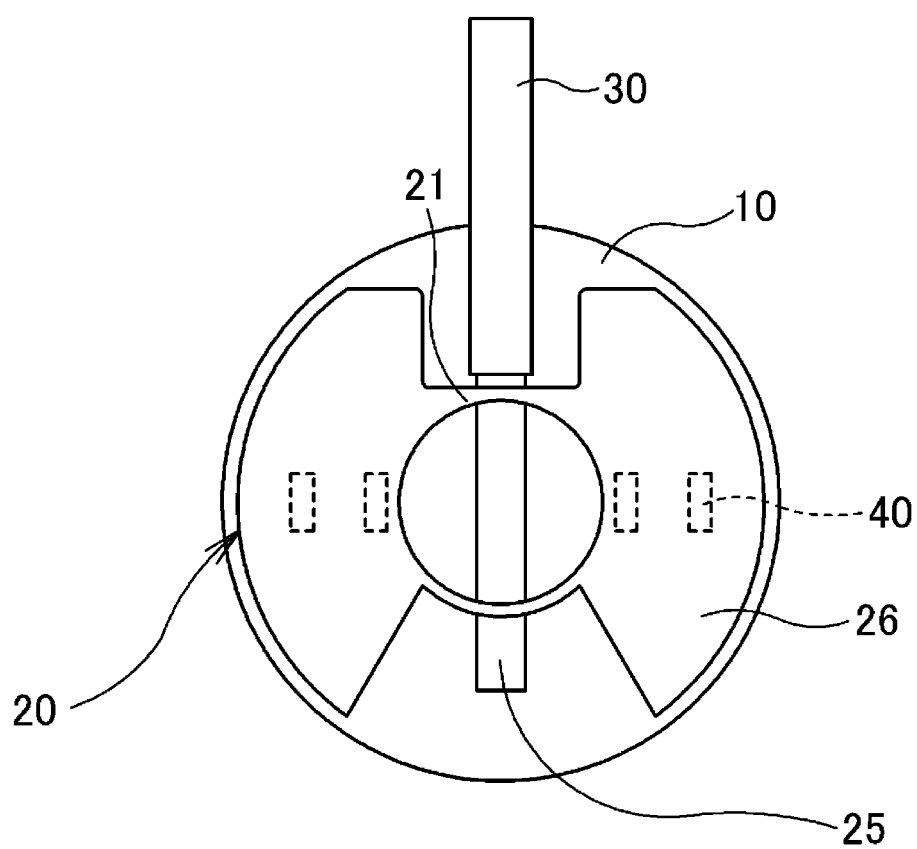
FIG. 7 is a plan view illustrating another example of a cap in an embodiment of the present technology.

A shape of the flange portion 26 (the shape as viewed from the top surface side of the cap 20) is not particularly limited, and a rectangular shape with rounded corners as illustrated in FIG. 6 can be employed, for example. In this example, the engaging portion 40 (indicated with the broken line in the figure) is provided in a portion protruding out from the body portion of the cap 20. As illustrated in FIG. 3, preferably a pair of fan-like shapes are disposed in an axial symmetric manner with respect to the facing pair of connecting portions 25. In other words, a circular shape from which the vicinities of the connecting portion 25 are cut is preferred. According to such a shape, as compared to the rectangular shape with the rounded corners of FIG. 6, the portion protruding out to the connecting portion 25 side can protect the connecting portion 25 itself and a portion of the hose 30 connected to the connecting portion 25. In a case where the flange portion 26 having such a fan-like shape is employed, preferably a separation distance between the connecting portion and the flange portion is from 15 mm to 30 mm. An appropriate separation distance between the connecting portion 25 and the flange portion 26 is ensured as described above, and thus good workability at the time of connecting the hose 30 to the connecting portion 25 can be maintained sufficiently. Note that "fan-like shape" in an embodiment of the present technology refers to a shape obtained by connecting a pair of concentric arcs with radial lines, and also includes a shape in which portions connecting the arcs are not linear as in the outflow channel 24 side of the flange portion 26 of FIG. 7. In a side to which the hose 30 is connected in advance, work of connecting the hose 30 is not performed except for the time of manufacturing. Thus, in the flange portion 26 of FIG. 7, an edge portion of the flange portion 26 extends along the extension direction of the connecting portion 25 to improve protection performance.

Figure 8A:
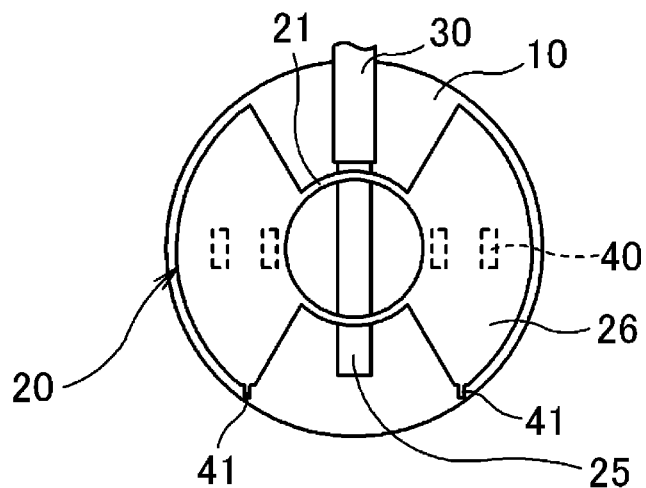
FIGS. 8A to 8C are plan views each illustrating another example of a cap in an embodiment of the present technology.
Figure 8B:
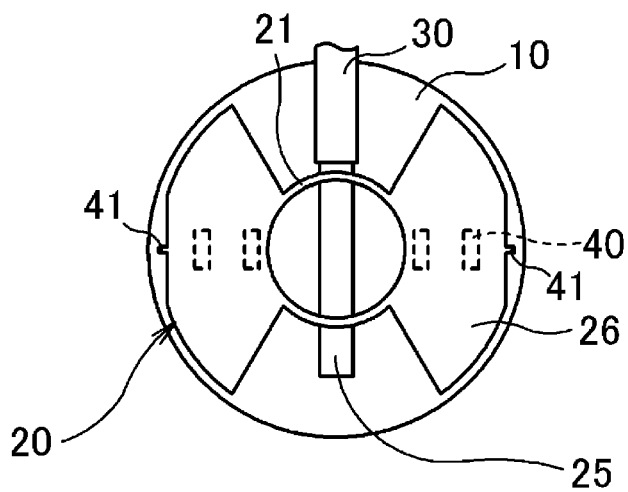
Figure 8C:
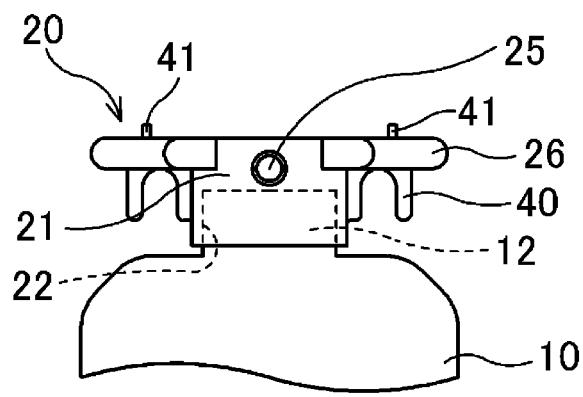
Figure 9:
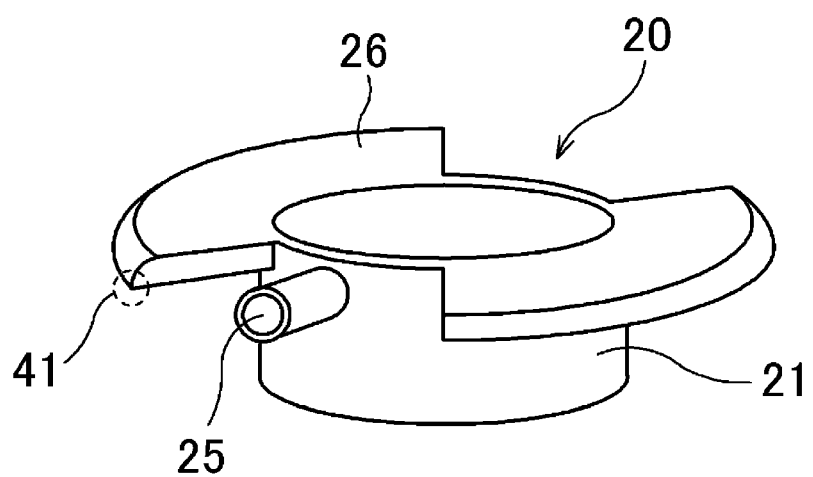
FIG. 9 is an enlarged explanatory diagram schematically illustrating main parts of another example of a cap in an embodiment of the present technology.

According to the above-described structure, the hose 30 can be engaged, and storability of the container 1 can be improved. Further, as an additional element, valve core pressing portions 41 may be provided in the cap 20. That is, in recent years, a function capable of releasing air when air is excessively injected into a tire has been omitted from a compressor main body in some cases for the further weight reduction of a puncture repair kit. Thus, preferably a structure capable of releasing air by pressing a distal end of a valve core is added to the cap 20 for good performance of a puncture repair kit. Specifically, preferably the valve core pressing portions 41 each of which has a shape capable of entering a tube having an inner diameter of 5 mm by a distance of from 0.5 mm or more to 1.5 mm or less are provided. In FIGS. 8A to 8C, the valve core pressing portions 41 each having the above-described shape are provided as protrusions protruding from the outer surface of the cap 20. Particularly, in FIG. 8A, the valve core pressing portions 41 are provided in corner portions of the flange portion 26. In FIG. 8B, the valve core pressing portions 41 are provided in arc portions of the flange portion 26. In FIG. 8C, the valve core pressing portions 41 are provided in an upper surface of the flange portion 26. Note that, even when the valve core pressing portions 41 are provided in the upper surface of the flange portion 26 as illustrated in FIG. 8C, the valve core pressing portions 41 are small protrusions enough to press the distal end of the valve core as described above, and thus storability of the container 1 as a whole is not affected. Additionally, in FIG. 9, the diameter of the lower surface of the flange portion 26 is larger than the diameter of the upper surface of the flange portion 26, and an edge of the upper surface and an edge of the lower surface of the flange portion 26 are coupled with a side surface having an arc cross-section. Thus, a portion of the flange portion 26 surrounded by the broken line in the figure (the portion at which the linear line portion connecting the concentric circle and the outer arc portion are coupled in the fan-like shape flange portion 26) is sharp at an acute angle. The sharp portion has a shape capable of entering the tube having the inner diameter of 5 mm by the distance of 0.5 mm or more, and thus this portion functions as the valve core pressing portion 41. In both the case where the valve core pressing portions 41 are provided as protrusions and the case where the flange portion 26 itself functions as the valve core pressing portions 41, preferably the distal ends of the valve core pressing portions 41 each have a surface to press the distal end of the valve core easily.

The invention claimed is:

1. A puncture repair kit container comprising:
   a container body including a holding portion that holds puncture repair liquid and an opening portion provided in one end of the holding portion;
   a cap mounted on the opening portion and including a connecting portion;
   a hose connected to the connecting portion provided in the cap; and
   an engaging portion that is provided in an outer surface of the cap and that engages the hose in an unused state by causing the hose to extend along a periphery of the cap; wherein
   in an uppermost surface of the cap, a flange portion is provided having a flat plate-like shape and having an outer diameter larger than outer diameters of all other portions of the cap,
   the flange portion has a fan-like shape as viewed from an uppermost surface side of the cap, and
   the connecting portion and the flange portion are separated from each other by a separation distance of from 15 mm to 30 mm.

2. The puncture repair kit container according to claim 1, wherein the hose is connected to the connecting portion on a side of an outflow channel for discharging the puncture repair liquid in the holding portion to the outside of the container, and has a length of from 50 mm to 150 mm.

3. The puncture repair kit container according to claim 1, wherein the flange portion has a surface facing the container body, and the engaging portion is disposed in the surface of the flange portion.

4. The puncture repair kit container according to claim 1, wherein the cap includes a valve core pressing portion, and
   the portion for pressing a valve core has a shape capable of entering a tube having an inner diameter of 5 mm by a distance of 0.5 mm or more.

5. The puncture repair kit container according to claim 2, wherein the flange portion has a surface facing the container body, and the engaging portion is disposed in the surface of the flange portion.

6. The puncture repair kit container according to claim 5, wherein the cap includes a valve core pressing portion, and
   the portion for pressing a valve core has a shape capable of entering a tube having an inner diameter of 5 mm by a distance of 0.5 mm or more.

* * * * *